US009384153B2

(12) United States Patent
Tkacik et al.

(10) Patent No.: US 9,384,153 B2
(45) Date of Patent: Jul. 5, 2016

(54) VIRTUALIZED LOCAL STORAGE

(75) Inventors: Thomas E. Tkacik, Phoenix, AZ (US);
Charles E. Cannon, Austin, TX (US);
Carlin R. Covey, Tempe, AZ (US);
David H. Hartley, Seaview Downs
(AU); Rodney D. Ziolowski, Austin, TX
(US)

(73) Assignee: Freescale Semiconductor, Inc., Austin, TX (US)

( * ) Notice: Subject to any disclaimer, the term of this patent is extended or adjusted under 35 U.S.C. 154(b) by 231 days.

(21) Appl. No.: 13/601,973

(22) Filed: Aug. 31, 2012

(65) Prior Publication Data
US 2014/0068133 A1 Mar. 6, 2014

(51) Int. Cl.
*G06F 13/36* (2006.01)
*G06F 12/00* (2006.01)
*G06F 12/02* (2006.01)
*G06F 12/06* (2006.01)
*G06F 9/26* (2006.01)
*G06F 9/34* (2006.01)
*G06F 13/16* (2006.01)

(52) U.S. Cl.
CPC .................................. *G06F 13/1694* (2013.01)

(58) Field of Classification Search
USPC ........................... 710/308; 711/1, 2, 202, 203
See application file for complete search history.

(56) References Cited

U.S. PATENT DOCUMENTS

| | | | | |
|---|---|---|---|---|
| 5,444,853 A * | 8/1995 | Lentz | ....................... | G06F 5/06 710/22 |
| 5,862,357 A * | 1/1999 | Hagersten et al. | ............ | 710/305 |
| 5,897,664 A * | 4/1999 | Nesheim et al. | .............. | 711/206 |
| 6,418,076 B2 | 7/2002 | Kawamata | | |
| 6,515,936 B1 | 2/2003 | Norman et al. | | |
| 6,868,471 B1 | 3/2005 | Kota | | |
| 7,680,987 B1 * | 3/2010 | Clark et al. | .................... | 711/147 |
| 2002/0169938 A1 * | 11/2002 | Scott et al. | ..................... | 711/207 |
| 2002/0191599 A1 * | 12/2002 | Parthasarathy et al. | ....... | 370/389 |
| 2004/0044872 A1 * | 3/2004 | Scott | ............................. | 711/202 |
| 2004/0160449 A1 * | 8/2004 | Gossalia et al. | .............. | 345/543 |
| 2005/0044340 A1 * | 2/2005 | Sheets et al. | .................. | 711/206 |
| 2005/0273571 A1 * | 12/2005 | Lyon et al. | ..................... | 711/203 |
| 2006/0067318 A1 * | 3/2006 | Gorodetsky et al. | .......... | 370/392 |
| 2006/0233168 A1 * | 10/2006 | Lewites et al. | ................ | 370/389 |
| 2007/0055810 A1 | 3/2007 | Tamura | | |
| 2007/0103997 A1 * | 5/2007 | Bennett | .................. | H04H 60/23 365/195 |
| 2007/0260827 A1 * | 11/2007 | Zimmer et al. | ............... | 711/154 |
| 2008/0086769 A1 * | 4/2008 | Conti | ...................... | G06F 21/74 726/15 |
| 2008/0104369 A1 * | 5/2008 | Reed | ............................... | 712/28 |
| 2009/0049220 A1 * | 2/2009 | Conti | ...................... | G06F 13/24 710/267 |
| 2009/0254728 A1 * | 10/2009 | Kamensky | .......... | G06F 12/0223 711/170 |
| 2010/0088477 A1 * | 4/2010 | Katsumata | .......... | G06F 12/0284 711/153 |
| 2011/0072234 A1 * | 3/2011 | Chinya et al. | ................. | 711/207 |
| 2012/0137075 A1 * | 5/2012 | Vorbach | ........................ | 711/122 |
| 2012/0159116 A1 * | 6/2012 | Lim | .................... | G06F 12/1072 711/206 |
| 2013/0290473 A1 * | 10/2013 | Chen et al. | .................... | 709/216 |

* cited by examiner

*Primary Examiner* — Faisal M Zaman

(57) ABSTRACT

Embodiments of electronic circuits, computer systems, and associated methods include a module that accesses memory using virtual addressing, the memory including local memory that is local to the module and nonlocal memory that is accessible via a system bus coupled to the module, the module including logic coupled to the local memory via a local bus. The logic is configured to receive a memory access specified to a virtual address, determine whether the virtual address is within the local memory, and direct the memory access either to the local memory via the local bus or to the nonlocal memory via the system bus based on the determination.

18 Claims, 11 Drawing Sheets

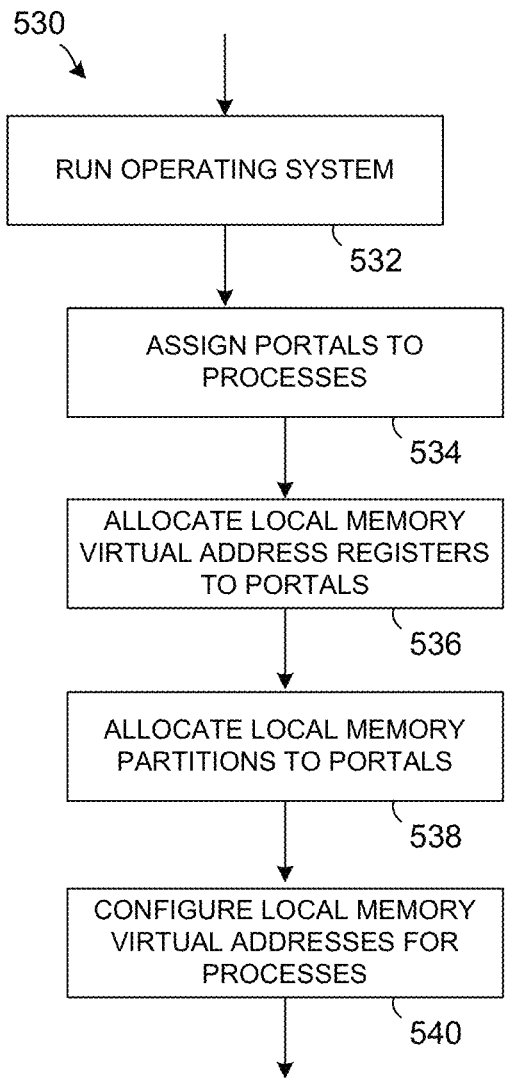
FIG. 5.1

VIRTUALIZED LOCAL STORAGE

BACKGROUND

Virtual memory is a memory management technique in which a computer architecture's various forms of computer data storage are virtualized, allowing a program to be designed as though the system includes and accesses only a single type of memory. The memory, as virtual memory, operates in the manner of directly addressable read/write memory (RAM). In a virtual memory system, virtual addresses used by software are translated to physical addresses when software accesses memory.

BRIEF DESCRIPTION OF THE DRAWINGS

Embodiments of the invention relating to both structure and method of operation may best be understood by referring to the following description and accompanying drawings:

In FIGS. 8, 9, and 10, as well as in FIGS. 1 and 2, arrows on the buses indicate the direction of address flow in the electronic circuit, while data may flow in either direction.

DETAILED DESCRIPTION

Embodiments of computer systems include a direct memory access (DMA)-equipped module programmed to access memory directly, independently of a processor. The DMA-equipped module may also contain local memory (interior to the module) for performance advantages as compared to nonlocal memory that is external to the module, for example system memory. Advantages of local memory include lower latency, higher throughput, facilitation of handling of different access types, and the like. The DMA-equipped module determines whether a memory access is directed to the local memory or the nonlocal memory for each access, typically based on address.

Embodiments of computer systems can also use virtual memory in combination with direct memory access. Virtual addresses used by software are translated to physical addresses when software accesses memory. Address translation likewise occurs in some locations in the system for DMA transactions. One embodiment includes an intermediate software component or driver translating addresses on behalf of the DMA-equipped module during programming. Another embodiment includes an intermediate module such as a memory management module translating the address for each access from the DMA-equipped module.

Including local memory in a DMA-equipped module when using external memory management, which virtualizes the local memory, has some drawbacks. Software supplies virtual addresses for the local memory when programming the DMA-equipped module. Using external memory management to translate the virtual addresses supplied by software to physical addresses while enabling access of either local or nonlocal memory loses the benefits of local memory. Structures and techniques within the DMA-equipped module that facilitate access of either local or nonlocal memory based on virtual addresses are desired.

Figure 8:
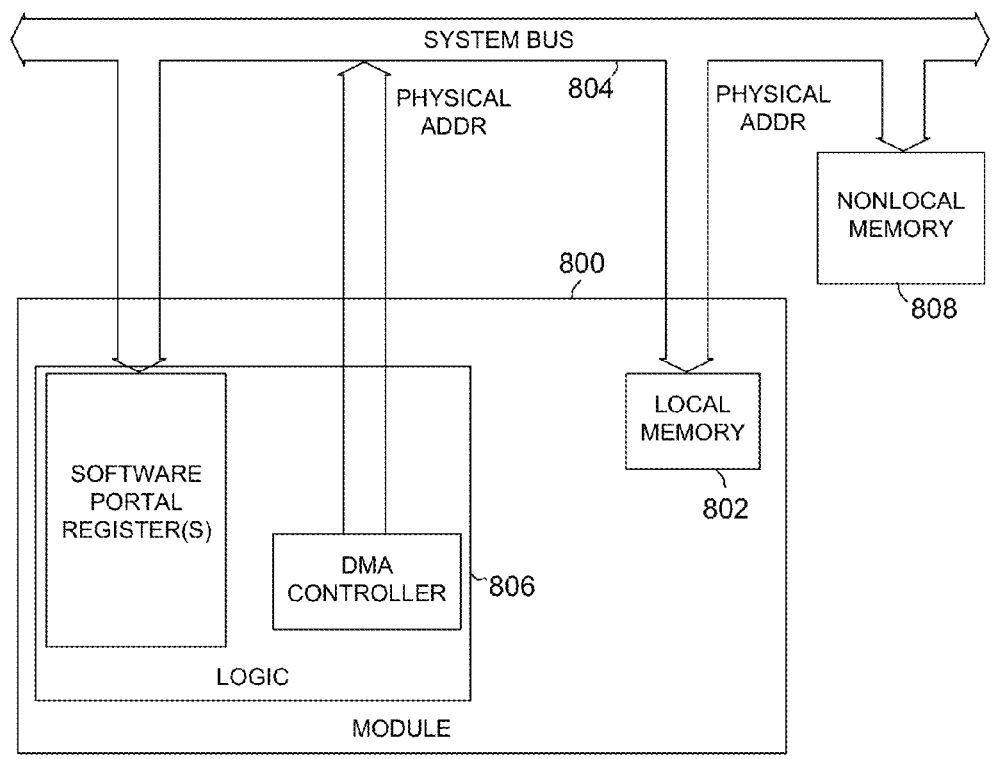
FIG. 8 is a schematic block diagram showing a device with local memory that uses a system bus external to the device to access local memory.

Referring to FIG. 8, a schematic block diagram illustrates a module or device 800 including local memory 802 that uses a system bus 804 that is external to the device 800 to access local memory 802. Logic 806 accesses both nonlocal memory 808 and local memory 802 by asserting physical addresses on the system bus 804. Both the module 800 and the remainder of the system have access to the local memory 802. The module 800 must use the external system bus 804 to access the local memory 802.

Figure 9:
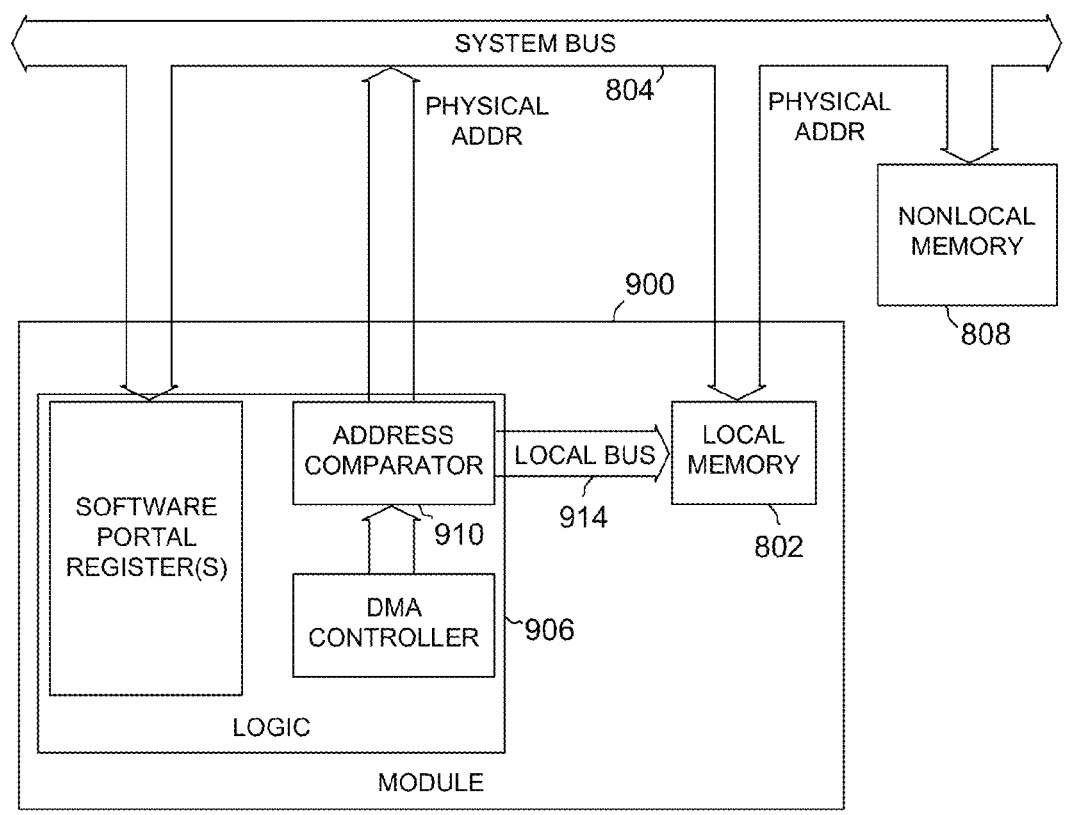
FIG. 9 is a schematic block diagram showing a device including local memory and a physical address comparator to select a local path to local memory.

Referring to FIG. 9, a schematic block diagram shows a module 900 that includes local memory 802 and a physical address comparator 910, which may select a local path to local memory 802. The system includes a module 900 with a local memory 802 that is accessible to both the logic 906 and the remainder of the system. The module 900 includes a physical address comparator 910 and a local bus 914 or path to the local memory 802, so that the module 900 does not need to use the external system bus 804 to access the local memory 802. Using the local bus is faster and allows another module to use the external system bus simultaneously, improving performance. Some physical resources connected on a system bus, for example application devices or modules, components with specific addressing can include a physical address comparator that directs accesses to specified addresses. For example, a peripheral computing module can include a direct memory access (DMA) engine that sends bus transactions on a system bus.

Figure 10:
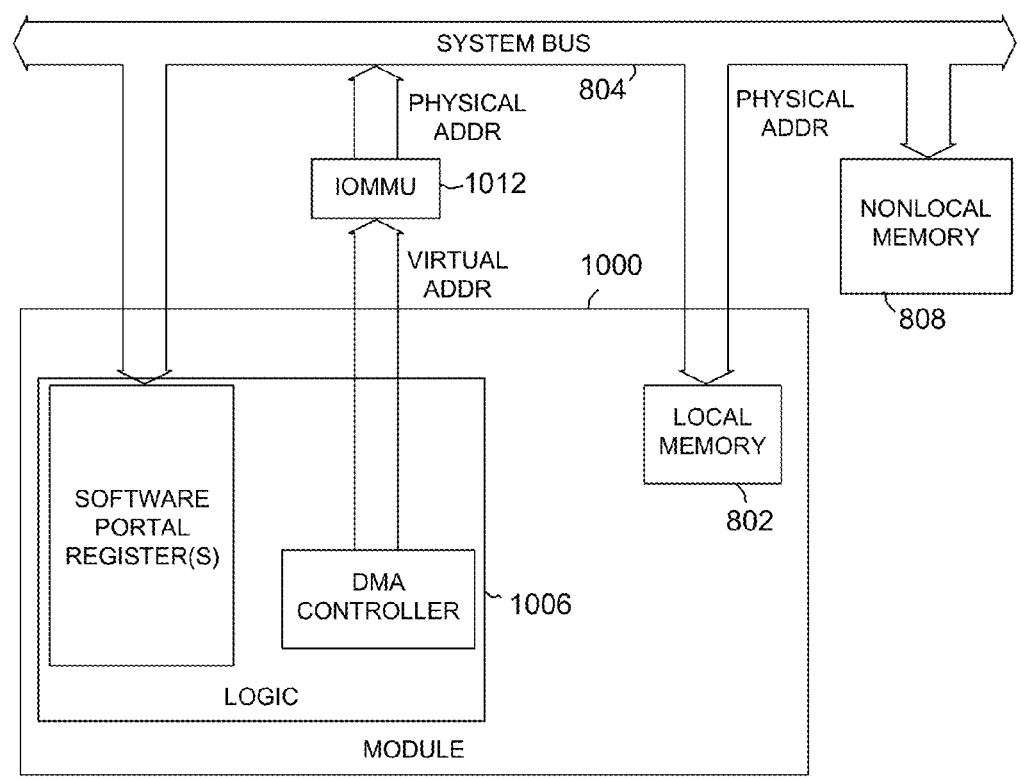
FIG. 10 is a schematic block diagram depicting a device including a local memory and virtual addressing of logic through operation of an IOMMU.

Referring to FIG. 10, a schematic block diagram depicts a device 1000 that includes a local memory 802 and logic 1006 that accesses a system bus 804 through operation of an IOMMU 1012. In contrast to the systems, circuits, and methods described with respect to FIGS. 1 through 7 and 9, no local path to local memory 802 is present. The system bus 804 can have an input/output memory management unit (IOMMU) such as a system MMU (SMMU), peripheral MMU (PMMU), or a peripheral address MMU (PAMU), or the like that translates virtual addresses to physical addresses as depicted in FIG. 10. The module 1000 can include a fast local memory 802, and therefore have a direct access bus to that memory. But the logic 1006 may address that local memory using virtual addresses and therefore the virtual addresses must be mapped to physical addresses. The mapping of virtual addresses to physical addresses is performed by the IOMMU 1012. If the IOMMU 1012 is outside the computing module, whether the address is destined for fast local memory or nonlocal memory cannot be determined. A method is desired to determine whether an address of a memory access is to be applied to the fast local memory, and therefore enabling bypass of the IOMMU 1012 and the system bus 804.

In a particular application, a system with trusted computing capability can operate not only on single-core devices, but also multi-core devices, and thus provide more than simply separation between different devices. A trusted computing system that uses IOMMUs can include a module such as a cryptographic accelerator or cryptographic engine that has local storage but does not operate with virtual addresses. A technique is desired that enables determination of which addresses will translate to local storage to enable usage of a fast local bus, thereby avoiding the slower external IOMMU and system bus. Various embodiments of electronic circuits, systems, executable logic, and associated operating methods enable determination of whether a given virtual address targets the local physical memory, and thus use of a fast local bus.

Embodiments of electronic circuits, systems, executable logic, and associated operating methods steer bus transactions to a local memory using virtual addresses, rather than physical addresses. Such memory access steering improves protection of memory as well as throughput and latency in comparison to steering of bus transactions to a local memory via physical addresses or via a mode switch. In particular embodiments, electronic circuits, systems, executable logic, and associated operating methods can use comparators to define a selectable region within virtual address space. Bus transactions using virtual addresses within a currently selected region are steered to the local memory. The embodiments of electronic circuits, systems, executable logic, and associated operating methods can enable implementation of a local memory on systems on chips (SOCs) that use two-level virtual addressing.

Figure 1:
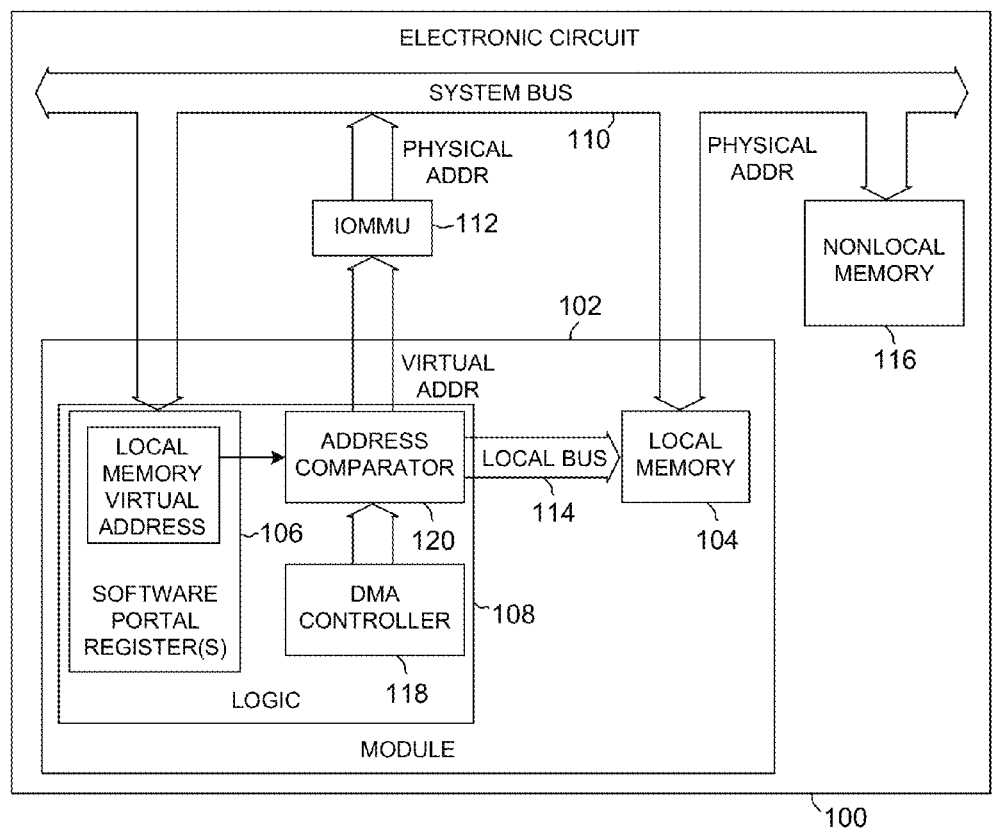
FIG. 1 is a schematic block diagram depicting an embodiment of an electronic circuit for use in enhancing protection of secure memory by determining whether access is for local memory without passing through system memory management and/or an external bus.

Referring to FIG. 1, a schematic block diagram depicts an embodiment of an electronic circuit that can be used to improve protection of secure memory by determining whether access is for local memory without passing through system memory management and/or an external bus. An embodiment of an electronic circuit 100 includes a module 102 that accesses memory using virtual addressing. The memory includes local memory 104 that is internal to and thus local to the module 102 and nonlocal memory 116 that is external to the module 102 and is accessible via a system bus 110 coupled to the module 102. The module 102 includes logic 108 coupled to the local memory 104 via a local bus 114 that is internal to and thus local to the module 102. The system bus 110 is external to the module 102 and is used by devices and components distinct from the module 102 to communicate with the module 102. The logic 108 is configured to receive a memory access request specified to a virtual address, determine whether the virtual address is within the local memory 104, and direct the memory access either to the local memory 104 via the local bus 114 or to the nonlocal memory 116 via the system bus 110 based on the determination. When the virtual address is within an address range of the local memory 104, the logic 108 directs the memory access to the local memory 104 via the local bus 114. When the virtual address is outside the address range of the local memory 104, the logic 108 directs the memory access to the nonlocal memory 116 via the system bus 110.

In some embodiments, the electronic circuit 100 can be configured such that the logic 108 determines whether the virtual address of the memory access is within address boundaries of the local memory 104. If so, the logic 108 calculates a local memory address from the virtual address and directs the memory access to the local bus 114 using the local memory address, thus bypassing the system bus 110, which is external to the module 102.

The illustrative electronic circuit 100 includes the system bus 110, nonlocal memory 116, and the module 102. The module 102 includes local memory 104, a DMA controller 118, and registers 106 of a software portal. The DMA controller 118 can use the system bus 110 to access either local memory 104 or nonlocal memory 116. The local memory 104 is accessible to portions of the system outside of the module 102 via the system bus 110. The module 102 is programmable by components and devices outside of the module 102 using the software portal. A single address space made up of physical addresses is used by all components to select among targets including local memory 104, the registers 106 of the software portal, nonlocal memory 116, and the like on system bus 110 and individual locations within the targets. The DMA controller 118 uses the system bus 110 to access either local memory 104 or nonlocal memory 116. Local memory 104 is accessible to components of the system outside the module 102 from the system bus 110. The module 102 is programmable by the remainder of the system using the software portal.

The software portal, which can also be called a portal or an interface portal, is a construct, for example implemented in hardware, enabling communication with the module 102, which can be a cryptographic engine or other peripheral device containing a DMA engine. The software portal can be one or more registers 106 within a specific bus address range that enables software to perform a specific task involving communication with the module 102. In an illustrative embodiment, the software portal can be a set of registers 106 inside the module 102 located in the device peripheral address map. The module 102 can include one or more software portals for use by software to communicate with the module 102. A particular software portal can be used to write to the module 102 while identifying what software is performing the communication.

In further embodiments, the electronic circuit 100 can be configured such that the module 102 further includes a software portal with a plurality of registers 106 configured with local memory virtual address information. The module 102 can further include an address comparator 120 coupled to the plurality of registers that uses the registers to determine whether the memory access is directed to the local bus 114 or the system bus 110.

In an illustrative embodiment, the electronic circuit 100 can be configured to perform data streaming and the module 102 can include a cryptographic processor, video processor, graphics engine, image processor, audio processor, and the like. For example, a graphics engine with very fast local storage or video hardware for storing some video frames can use the fast data path, while maintaining access to nonlocal memory, for example external memory, system memory, or the like.

The local memory 104, one or more registers 106, and operating logic 108 can be part of a module 102 that is configured to perform various applications, for example information processing, video streaming, signal processing, cryptography, and many others. For each software portal of one or more software portals assigned to different operating systems, a register 106 can be programmed by the control operating system, for example a hypervisor. The register 106 is programmed to contain the virtual address of the local memory 104.

In additional embodiments, the electronic circuit 100 can be configured such that the module 102 further includes a DMA controller 118 that uses virtual addressing, and an address comparator 120 coupled to the DMA controller 118 that determines whether the memory access is directed to the local bus 114 or the system bus 110 and bypasses the system bus 110 when the DMA controller 118 accesses the local memory 104.

As shown in the depicted electronic circuit 100, the local memory 104 has two access ports including one coupled to the system bus 110 and one coupled to the local bus 114. The local bus 114 connects the address comparator 120 to the local memory 104. The address comparator 120 uses the virtual address of the local memory 104 to determine whether to access the local memory 104 by using the local bus 114 or the system bus 110. The virtual address is configured in the address comparator 120 by programming a register 106 that contains the virtual address of the local memory, improving flexibility and functionality over a hard-wired configuration. The DMA controller 118 can use the local bus 114 to access local memory 104, bypassing the system bus 110. Using the local bus 114 achieves several advantages over accesses via the system bus 110 including lower latency, higher throughput, enablement of different types of access, and reduction of system bus loading.

In other embodiments and/or applications, the electronic circuit 100 can be configured such that the module 102 further includes logic 108 that modifies a received virtual address by addition, subtraction, or truncation and accesses the local memory 104 using the modified virtual address.

Various embodiments can include any suitable memory management device. For example in a system including an ARM processor, a system MMU can be used for memory management. In another example, a PowerPC processor system can use a PAMU, which is a memory management unit for peripheral devices that incorporate a DMA engine, but operates in the manner of an MMU for the processor.

A module 102 can include any suitable amount of local memory 104. Some modest applications can include a local memory capacity of 16 kilobytes (Kbytes) to 64 Kbytes of memory, although some implementations can have as small a memory as 4 Kbytes or even 1 Kbyte. Other implementations can have much larger capacities of multiple megabytes of memory or more. Illustrative embodiments can apply to any DMA engine that has a local storage, any local storage that is also accessible by the remainder of the system, or a system that supports local access including fast local accesses and relatively slower local addresses with additional capabilities.

The electronic circuit 100 can use memory management devices or components to manage access of memory using virtual and physical addressing. The illustrative system can include an input/output memory management unit (IOMMU) 112 to perform memory management. The IOMMU 112 can translate virtual addresses to physical addresses. The DMA controller 118 uses virtual addresses. Logic such as software on a processor can also use virtual addresses. Physical addresses are used on the system bus 110.

Using the IOMMU 112 with a DMA-equipped module 102 facilitates operations on virtual memory systems. For example, a virtual memory operating system can configure the IOMMU 112 with a map of virtual to physical addresses for a particular process, enabling the process to program the module 102 directly without operating system intervention. In another example operation, a hypervisor can configure the IOMMU 112 with a map of virtual to physical addresses for a particular virtual machine and a virtual machine guest operating system can program the module 102 directly without hypervisor intervention. In a further example application, a virtual to physical address map can be fragmented such that a contiguous virtual address block is made up of many smaller contiguous physical address blocks. The IOMMU 112 can handle the fragmentation in a "scatter-gather" operation. In a system that does not include an IOMMU, either software or the DMA controller handles scatter-gather processing, lowering performance or raising complexity.

In a configuration different from the depicted embodiments in which the address comparator is moved outside module between an IOMMU and a system bus, local bus advantages are lost since (1) the IOMMU may be shared by multiple DMA-equipped modules, adding latency and slowing throughput for the module using local memory, (2) the IOMMU may not have a suitable translation configured or cached internally and thus is delayed waiting for a page table lookup, adding substantial latency, and (3) the IOMMU system bus interface commonly lacks multiple access types.

The illustrative electronic circuit 100 avoids these drawbacks at least partly by including logic 108 in the module 102 that, based on a received virtual address, determines between using the local bus 114 and the system bus 110 for the access, and selects the correct local memory location. The electronic circuit 100 also improves functionality by including an address comparator 120 configured to perform comparisons based on the virtual address and the local memory virtual address configured in the software portal 106. These improvements to the electronic circuit 100, the module 102, and associated operating techniques enable and maintain local bus advantages.

The electronic circuit 100 depicted in FIG. 1 is a virtual memory system including the local bus 114 for accessing the local memory 104. The module 102 includes the address comparator 120, which is connected to the local memory 104 via the local bus 114. The module 102 further includes a software portal with registers 106 configured with local memory virtual addresses. In a relatively simple embodiment, local memory 104 can map to a single contiguous virtual address range. The module 102 further includes the DMA controller 118, which uses virtual addressing. The address comparator 120 uses local memory virtual address registers to determine whether to use the local bus 114 or the system bus 110 for each transaction. In a relatively simple embodiment, translation to the local memory location can be by subtraction, although any suitable operation can be implemented such as addition, truncation, and the like. The system bus 110 is bypassed when the DMA controller 118 accesses local memory 104. The illustrative electronic circuit 100 thus fully attains the benefits of both the local bus 114 and the IOMMU 112.

Figure 2:
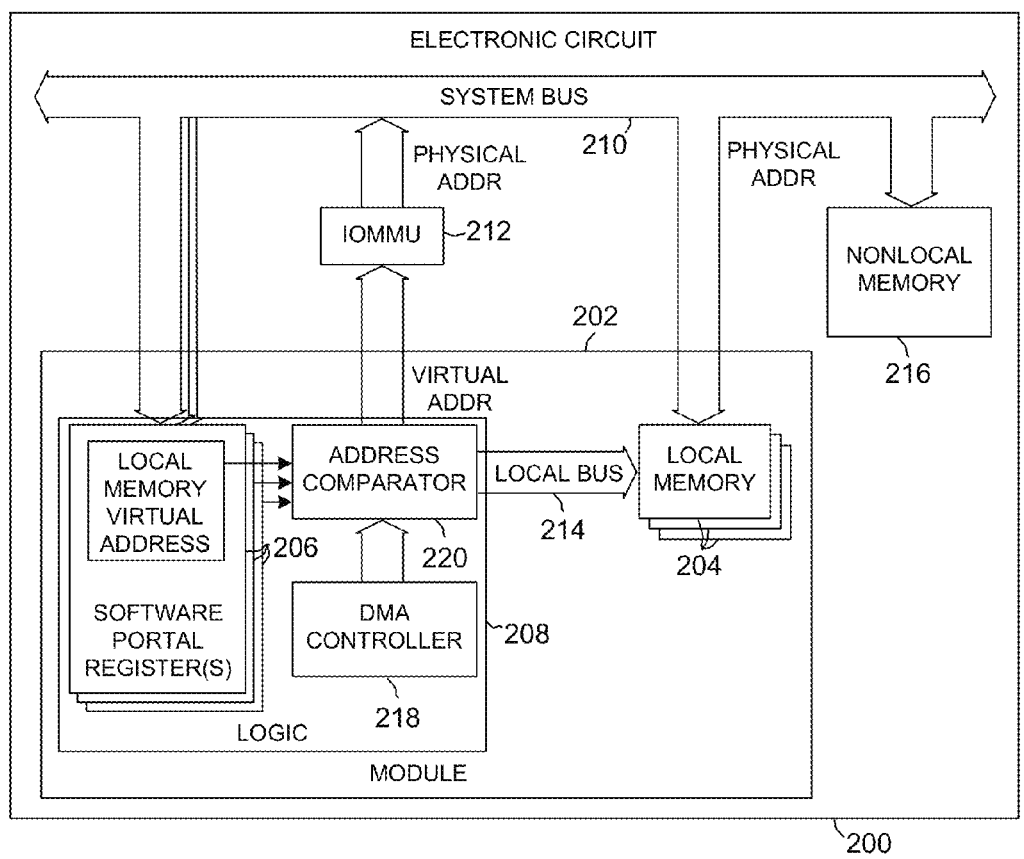
FIG. 2 is a schematic block diagram showing an embodiment of an electronic circuit that can be used to enhance protection of secure memory for memory accesses by multiple parties to multiple partitions in local memory.

Referring to FIG. 2, a schematic block diagram depicts an embodiment of an electronic circuit that can be used to further enhance protection of memory for memory accesses by multiple partitions in local memory. Accordingly, the electronic circuit 200 can be configured such that a module 202 includes a plurality of software portals respectively assigned to a plurality of software components, and a plurality of registers 206 configured with local memory virtual address information for the software components, for example guest operating systems, hypervisors, and the like. The multiple registers 206 can include distinct local memory virtual address registers respectively allocated for the plurality of software components designating respective distinct partitions in the local memory 204. The module further includes a DMA controller 218 and an address comparator 220. The DMA controller 218 uses virtual addressing and indicates the software portal of the plurality of software portals and hence the software component for which the memory access is made. The address comparator 220 selects local memory virtual address registers for the indicated software portal and directs local memory accesses via the local bus 214 to a distinct local memory partition corresponding to the indicated software portal.

The illustrative module 202 includes multiple software portals and separate local memory virtual address registers 206 for each software portal, and separate partitions in local memory 204 for each software portal. The DMA controller 218 indicates on behalf of which software portal each memory access is made. The address comparator 220 selects local memory virtual address registers 206 for the software portal indicated by the DMA controller 218. Logic 208 directs local memory accesses via the local bus 214 to the local memory partition corresponding to the software portal. The module 202 can operate within multiple virtual address spaces concurrently. The logic 208 can direct identical virtual addresses for different software portals to different local memory partitions.

The module 202 can also access nonlocal memory 216 via the system bus 210 for memory accesses that are outside the range of the local memory 204. In some configurations, the module 202 can access the nonlocal memory 216 via the system bus 210 under management of an IOMMU 212.

Figure 3:
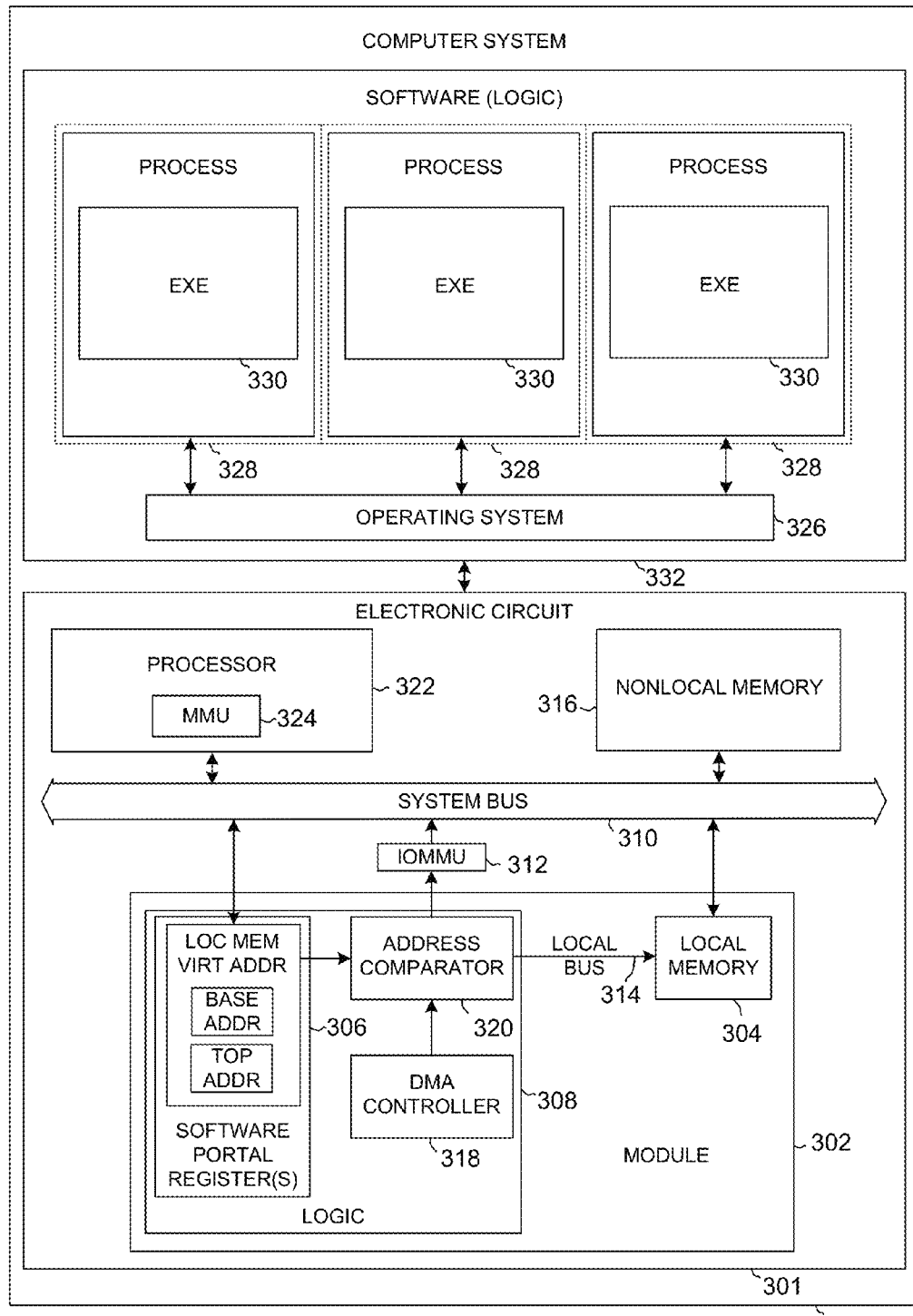
FIG. 3 is a schematic block diagram illustrating an embodiment of a computer system that includes a virtual memory operating system, and improves protection of secure memory by efficiently directing memory accesses to local memory without passing through system memory management and/or an external bus.
Figure 4:
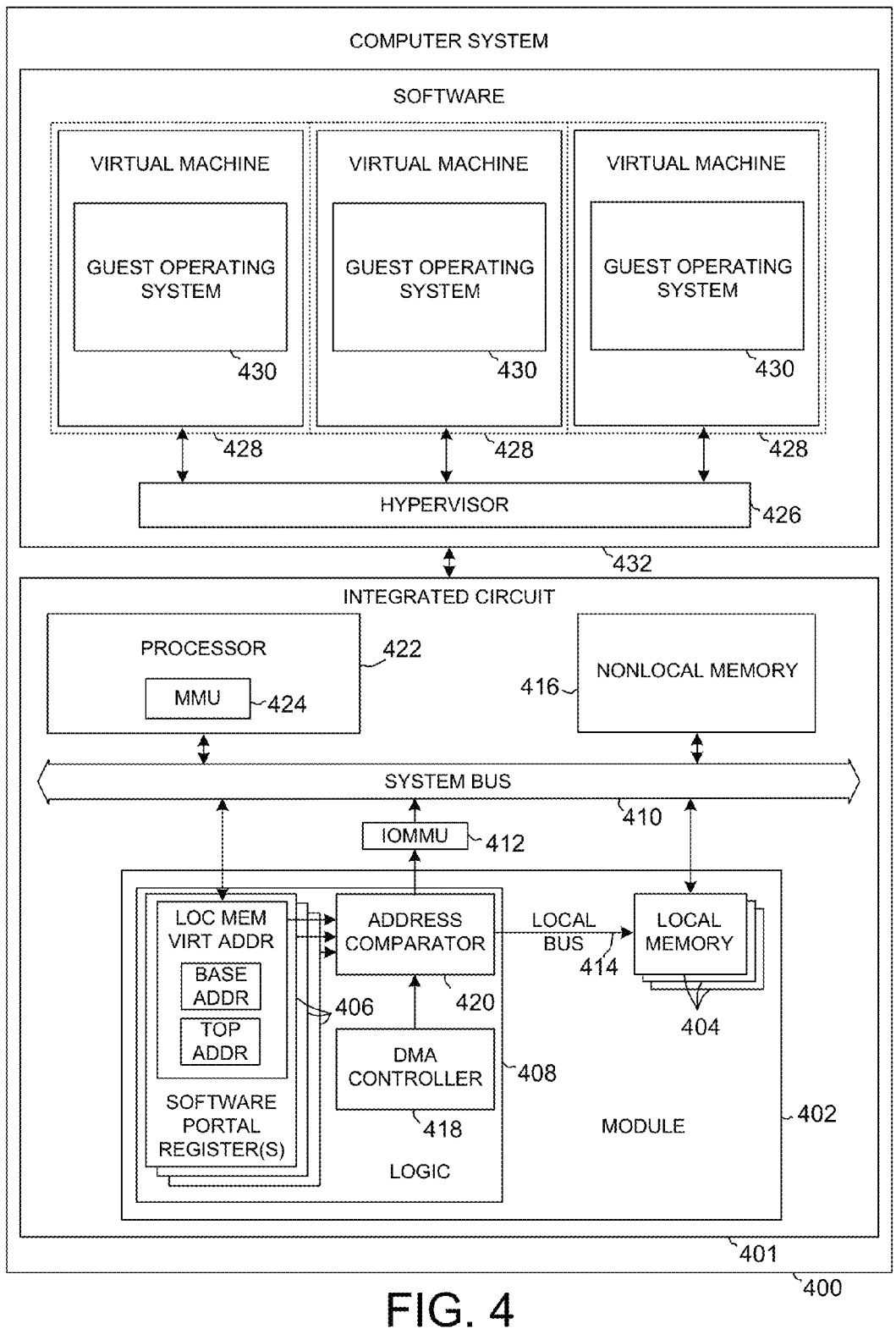
FIG. 4 is a schematic block diagram illustrating an embodiment of a computer system that includes a hypervisor and virtual machines, and attains improvement in memory protection by efficiently directing memory accesses to local memory without passing through system memory management and/or an external bus.

Processes running on a single operating system, and virtual machines running on a hypervisor are two examples of computer systems using virtual memory. FIG. 3 illustrates a computer system with processes running on a single operating system and a module with a single software portal and a single local memory partition. FIG. 4 depicts a computer system with virtual machines running on a hypervisor and a module with multiple SW portals and multiple local memory partitions.

Referring to FIG. 3, a schematic block diagram illustrates an embodiment of a computer system 300 that improves protection of secure memory in combination with throughput and latency performance by efficiently directing memory accesses to local memory without passing through system memory management and/or an external bus. An illustrative embodiment of a computer system 300 includes an electronic circuit 301 including a system bus 310, a nonlocal memory 316 coupled to the system bus 310, a module 302 coupled to the system bus 310, and a processor 322 coupled to the system bus 310. The module 302 includes logic 308 and a local memory 304, and is configured to access the local memory 304 and the nonlocal memory 316 using virtual addressing. The logic 308 is configured to receive a memory access specified to a virtual address, determine whether the virtual address is within the local memory 304, and direct the memory access either directly to the local memory 304 via the local bus 314 or to the nonlocal memory 316 via the system bus 310 based on that determination. The processor 322 executes instructions including instructions for accessing the local memory 304 and the nonlocal memory 316.

The illustrative computer system 300 can include hardware and software. The hardware can include the electronic circuit 301, which includes a DMA-equipped module 302, an IOMMU 312, a system bus 310, nonlocal memory 316, and the processor 322. The processor 322 executes software instructions and can include a processor MMU 324 for translating virtual addresses to physical addresses for software accesses that use the system bus 310. The software 332 can include an operating system 326 and executable processes 328. The operating system 326 configures the hardware and manages software processes 328. The processes 328 provide context for executables (EXE) 330 running on the processor 322. The operating system 326 creates and manages a virtual address to physical address map for each process 328, for example by configuring the processor MMU 324 and the IOMMU 312 with the virtual address to physical address map for each process 328. The operating system 326 assigns the software portal 306 to one process at a time with the operating system 326 including the physical addresses for the software portal and local memory in the process virtual address space, and the operating system 326 configuring the local memory virtual address for the process in the software portal registers 306. The executable 330 operates the module 302 with commands of the executable 330 sent to the module 302 using the process virtual address space. The module 302 accesses memory including the local memory 304 and the nonlocal memory 316 using the DMA controller 318 on behalf of the executable 330 in which the memory accesses use the process virtual address space, and the memory accesses are directed via the local bus 314 (a "fast internal path") or the system bus 310. If desired, the operating system 326 can assign multiple virtual address ranges, or aliases, for local memory 304, including one virtual address range directed via the local bus 314 and other virtual address ranges directed via the system bus 310. Multiple processes 328 may time share the software portal in which the operating system 326 resets the local memory virtual address configuration when re-assigning the software portal 306.

Accordingly, in some embodiments, the computer system 300 can further include executable logic 332 which can be implemented in software, firmware, or any configuration of executable program code. The executable logic 332 can include at least one operating system 326 that configures the electronic circuit and manages a plurality of processes 328, and the processes 328, which provide context for executables 330 executing on the processor 322. In a more particular example embodiment, the computer system 300 can further include executable logic 332 with one or more operating systems 326, which create and manage a map for converting virtual addresses to physical addresses for the multiple processes 328. The operating system(s) 326 can also configure memory management, including the MMU 324 and IOMMU 312, with the map for one or more of the multiple processes 328.

Accordingly, in further embodiments the computer system 300 can also include the module 302 and executable logic 332 including an operating system 326. The module 302 includes a plurality of portals, a plurality of local memory virtual address registers 306, and a plurality of local memory partitions. The executable logic 332 includes the operating system 326 that assigns the plurality of portals selectively to a plurality of processes 328, for example by allocating the plurality of local memory virtual address registers 306 selectively to the plurality of portals, allocating the plurality of local memory partitions selectively to the plurality of portals, and configuring local memory virtual addresses for the plurality of processes 328.

In some embodiments, the module 302 can include a comparator 320 for determining whether the virtual address of the memory access is within a range of virtual addresses in the local memory 304. Thus the illustrative electronic circuit 301 can include a register 306 that holds the virtual address of the base of local memory 304 and the comparator 320 that determine whether the virtual address of the current memory transaction is within the range of virtual addresses occupied by the local memory 304.

The electronic circuit 301 can be generalized to support different sizes of local memory 304 by including a register 306 for holding the virtual address of the top of local memory 304. Accordingly, in various embodiments and/or applications, the electronic circuit 301 can be configured such that the one or more registers 306 includes a base address register loaded with the local memory base address and a top address register loaded with the local memory top address. In another arrangement, the one or more registers 306 may include a memory size register along with the base address register.

In some embodiments and/or applications, the computer system 300 can further include executable logic 332 such as software, firmware, or the like, made up of executables 330, which operate the module 302 using commands dispatched to the module 302 specifying virtual addresses configured for the plurality of processes 328. In more particular embodiments, the computer system 300 can further have executable logic 332 including executables 330 configured to operate the module 302 such that, for the module 302 which further includes the DMA controller 318 that uses virtual addressing, the module 302 selectively accesses the local memory 304 and the nonlocal memory 316 using the DMA controller 318 on behalf of the executables 330.

Furthermore, in various embodiments the computer system 300 can further include the module 302 further with a portal such as a software portal, and executable logic 332 made up of the operating system 326 and multiple processes 328. The computer system 300 can operate such that multiple processes 328 time-share the portal and the operating system 326 resets a local memory virtual address configuration during re-assignment of the portal.

Referring to FIG. 4, a schematic block diagram illustrates an embodiment of a computer system 400, for example a system on a chip (SOC) that includes a hypervisor 426 and virtual machines 428, and attains improvement in protection of memory and also throughput and latency performance by efficiently directing memory accesses to local memory 404 without passing through system memory management and/or an external bus. In various embodiments and/or applications, the computer system 400 further includes executable logic 432 in the form of software, firmware, or other executable program code. The executable logic 432 includes a plurality of virtual machines 428 that provide context for a respective guest operating system of a plurality of guest operating systems 430, and a hypervisor 426 that configures the electronic circuit 401 and manages the plurality of virtual machines 428. The hypervisor 426 is configured to create and manage a map for converting virtual addresses to physical addresses for each of the plurality of guest operating systems 430, and configures memory management with the map for one or more of the plurality of virtual machines 428.

The illustrative computer system 400 can include hardware and software. The hardware can include the electronic circuit 401, which includes a DMA-equipped module 402 (for example a cryptographic module), an IOMMU 412, a system bus 410, nonlocal memory 416, and the processor 422. The processor 422 executes software instructions and can include a processor MMU 424 for translating virtual addresses to physical addresses for software accesses that use the system bus 410. The software can include a hypervisor 426 and virtual machines 428. The hypervisor 426 configures the hardware and manages virtual machines 428. The virtual machines 428 provide context for a guest operating system 430 running on the processor 422. The hypervisor 426 creates and manages a virtual address to physical address map for each virtual machine 428, for example by configuring the processor MMU 424 and the IOMMU 412 with the virtual address to physical address map for each virtual machine 428. The hypervisor 426 partitions local memory 404 and software portals 406 among virtual machines 428. For example, the hypervisor 426 can include the physical addresses for one software portal 406 and one local memory partition 404 in the virtual address space for a virtual machine 428. The hypervisor 426 configures the local memory virtual address for a virtual machine 428 in module registers 406 for the assigned software portal. The guest operating system 430 operates the module 402 with instructions of the guest operating system 430 using the process virtual address sent to the module 402. The module 402 accesses memory including the local memory 404 and the nonlocal memory 416 using the DMA controller 418 on behalf of the guest operating system 430 in which the memory accesses use the virtual machine virtual address, indicating the software portal making the access. The memory accesses are directed via the local bus 414 or the system bus 410. For example, a local bus access can be directed to the local memory partition which corresponds to a software portal.

In contrast to the computer system 300 shown in FIG. 3, the computer system 400 enables the MMU 424 and the IOMMU 412 to translate the virtual address of a virtual machine 428 to a physical address rather than, or in addition to, translating the virtual address of a process to the virtual address of a virtual machine. The number of software portals and local memory partitions 404 need not match number of virtual machines. Related virtual machines may be given same virtual address to physical address map and access to the same software portal and local memory partition 404. Unrelated virtual machines 428 may time-share a single software portal in a manner similar to the operation of the computer system 300 depicted in FIG. 3.

Accordingly, in further embodiments the computer system 400 further includes the module 402 and executable logic 432. The module 402 includes a plurality of portals, a plurality of local memory virtual address registers 406, and a plurality of partitions in the local memory 404. The executable logic 432 includes a hypervisor 426 and plurality of virtual machines 428. The hypervisor 426 partitions the local memory 404 and the plurality of portals among the plurality of virtual machines 428, and configures a local memory virtual address for the plurality of virtual machines 428 in the local memory virtual address registers 406 for an assigned portal of the plurality of portals. The hypervisor 426 is configured to assign a virtual machine virtual address to one or more of the plurality of virtual machines 428. The virtual machine virtual address includes a selected portal and a selected local memory partition.

In some embodiments, the computer system 400 can further include executable logic 432 including a guest operating system 430 running on a virtual machine 428, which operates the module 402 using commands dispatched to the module 402 using a virtual address configured for the virtual machine 428. In additional embodiments, the computer system 400 can further include the module 402 and executable logic 432. The module 402 can include a DMA controller 418 and a software portal 406. The executable logic 432 can include a guest operating system 430 running on a virtual machine 428 that accesses the local memory 404 and the nonlocal memory 416 using the DMA controller 418 on behalf of the guest operating system 430 as specified by a virtual address and software portal 406 configured for the virtual machine 428.

The electronic circuit 401 can be further generalized to modify the virtual address by addition or subtraction before presenting the modified address to local memory 404. Thus, in further embodiments of the electronic circuit 401, the module 402 can further include logic 408 that modifies a received virtual address by addition, subtraction, or truncation and applies the modified virtual address to the local memory 404.

The electronic circuit 401 and associated operating method, with or without optional extensions such as address modification, can be replicated to support multiple software portals, each of which may use a different virtual address for the base address of local memory 404. Thus embodiments of the electronic circuit 401 can include a plurality of base address registers holding the virtual base address of the local memory 404 assigned to each software portal. The logic 408 can determine that the multiple guest operating systems 430 use different virtual addresses to access the local memory 404 based on the software portal used during the memory access. In other embodiments, the electronic circuit 401 can be configured such that the module 402 includes a plurality of local memories 404, a plurality of registers 406 that hold virtual addresses of the local memories 404, and logic 408. The logic 408 can determine whether the memory access is directed to one or more of the plurality of local memories 404 and, if so, calculates a local memory address from the virtual address, and directs the memory access to a local bus using the local memory address, bypassing system memory management 412 and the system bus 410.

An embodiment of the electronic circuit 401 can thus be managed by a hypervisor 426, which virtualizes local storage. The electronic circuit 401 can be configured to operate in cooperation with a hypervisor 426 or other control operating system. When the hypervisor 426 instantiates a guest operating system 430, the hypervisor 426 can program a base address register in a software portal 406 with the virtual address of the base of local memory 404. Optionally, the hypervisor 426 can program a top address register in the software portal 406 with the virtual address of the top of local memory 404. When a DMA controller 418 generates a bus transaction using virtual addressing and the identity of the relevant software portal, an address comparator 420 can determine whether the virtual address asserted by DMA controller 418 falls within the range of virtual addresses. If so, the bus transaction is steered to local memory 404 using the local bus 414. If not, the bus transaction is steered to nonlocal memory 416 via system bus 410. The comparators find addresses internal to the module, with other addresses to be passed on to the system bus 410. Other address decoding, external to the module 402, can also be used to steer external addresses directly from the system bus 410 to the local memory 404.

The bus transaction internal to module 402 thus bypasses system memory management and the external system bus 410. Some configurations may not include system memory management, particularly address translation, on the system bus. Address space aliases can redirect the transaction back to the local memory 404 via the external bus. Bypassing system memory management enables improved protection of secure memory as well as performance in throughput and latency, and in some configurations can enable different memory access controls.

In further embodiments, the components and functionality for virtualizing local memory 404 can be used to steer the same virtual address values appearing in different virtual machine virtual address spaces to two or more different local memories, or to different portions of the same large local memory. Hence, embodiments of the electronic circuit 401 can be configured so that the module 402 further includes logic 408 that directs memory accesses for a plurality of virtual machines 428 and guest operating systems 430. The logic 408 can be operable to direct identical virtual address values allocated in different virtual machine address spaces to a plurality of different local memories 404 or to different locations in a same local memory 404.

In an illustrative embodiment, the electronic circuit 401 can be configured to perform cryptographic processing and the module 402 can include a cryptographic engine. For an embodiment in which the module 402 is a cryptographic module or cryptographic engine, the module 402 can be a co-processor that executes descriptors and has a DMA engine 418 and DMA master port. The embodiment may not use memory management, for example the MMU 424 and IOMMU 412 may be disabled. The DMA engine 418 then uses physical addressing. The cryptographic module 402 also includes the local memory 404, which is used for security and performance. When the cryptographic module 402 generates a DMA request, the request may be to local memory 404. The DMA engine 418 compares the physical address with the local memory physical address space to determine whether the request is made to local memory 404. In an illustrative embodiment, all requests to local memory 404 use a fast local bus 414. Some system on a chip (SOC) embodiments 400 can use memory management, and cryptographic module addresses are virtual addresses rather than physical addresses. These SOC embodiments may also disable memory management. The location of local memory 404 in virtual address space may change, and if multiple guest operating systems 430 are running under a hypervisor 426, local memory 404 may have multiple virtual addresses. The integrated circuit 401 disclosed herein and associated method enable the DMA engine 418 to determine whether the cryptographic module virtual address should be routed to the fast local bus 414 to the local memory 404, or whether the address is an external address that passes through the IOMMU 412. The DMA engine 418 in the cryptographic module 402 is on the virtual side of the IOMMU 412 and therefore cannot use the IOMMU 412 to translate the address and then compare a physical address with the physical address of the local memory 404. The illustrative system and technique thus can use virtual addresses for enablement of the memory system, enabling and disabling multiple memory systems connected to the same bus during actual memory read and write transactions.

The components and functionality for virtualizing local memory can be replicated or time-shared to support multiple operating systems each with different virtual addresses for the same local memory. Thus, in some embodiments the module 402 can further include logic 408 that is replicated or time-shared for a plurality of operating systems respectively allocated to distinct virtual addresses in the local memory 404, which is shared by the plurality of guest operating systems 430.

In an example embodiment of a security system, the local memory 404 can be used for cryptographic functions of the cryptographic module 402, for example to store a key that is protected or to implement other special protection. The cryptographic module 402 may access a resource such as a region of the local memory 404, termed a secure memory. The secure memory can be partitioned into multiple pages using a map of the page size convenient for one or more guest operating systems. Several pages can be allocated to one guest operating system 430. Some keys can be placed in the local memory 404 for managed use. Some locations of the local memory 404 can be allocated for quick access, operating in the manner of a cache, for example for storing frequently used data or descriptors. The local memory 404 can have access control at specified levels, for example wide open access, a memory block with usage limited to particular guest operating systems, a memory block usable by any guest operating system, a memory block limited to particular usage, and the like. Some portions of local memory 404 can be accessible as any on-chip memory. Other portions of local memory 404 can be accessible only to internal requests by the cryptographic module 402 using the local bus 414. Typically a block of local memory 404 can be used for storing different keys for different guest operating systems. The local bus 414 can function as a fast internal pathway and enable higher speed accesses of the local memory 404 in comparison to the system bus 410 returning to a port of the local memory 404. The local bus 414 can also enable access to a selected portion of local memory that is not accessible via the system bus 410.

Techniques for use with a descriptor enable the local memory 404 to be accessed by a particular guest operating system 430. Otherwise, when not running the descriptor, access is not allowed. Accordingly, access to the local memory 404 can be limited to an access using an enabling descriptor so that if the descriptor is running on the cryptographic module 402, local memory access is allowed. If the descriptor is not running on the cryptographic module 402, then access to the local memory 404 is prevented. The descriptor enables a signal that is internal to the cryptographic module 402 and does not pass off module. No other devices in the SOC 400 have access to the signal. In contrast to the local bus 414 internal to the module 402, a memory access via the external system bus 410 does not permit such fine-grain access control because the security signals operated by the descriptor do not pass to a nonlocal memory port.

The descriptor can specify various other attributes. For cryptographic modules in which the local connection is not any faster than the system bus, attributes can be used to prevent secure information from passing out over the rest of the system. System embodiments outside of the realm of security or cryptographic functionality can also use attributes specified by a descriptor, such as attributes applicable to a graphics engine that has a fast local bus.

The illustrative computer system 400 can have improved memory security protection by including components and logic for determining whether access is for local memory without passing through system memory management and/or an external bus. In an illustrative embodiment, the computer system 400 includes an electronic circuit 401 that can include a system bus 410, a direct memory access engine 418 that sends bus transactions on the system bus 410, and an IOMMU 412 coupled to the system bus 410 that translates virtual addresses to physical addresses. The system on an electronic circuit 401 can further include at least one software portal respectively allocated for at least one guest operating system 430 and a module 402 or execution engine. The module 402 can include a local memory 404, one or more registers 406 that holds a virtual address of the local memory 404, and logic 408. The logic 408 can be configured to determine whether a memory access is directed to the local memory 404 and, if so, to calculate a local memory address from the virtual address, and direct the memory access to a local bus using the local memory address, bypassing an external system bus 410. The computer system 400 can further include a hypervisor 426 configured to run the one or more guest operating systems 430 which is configured to program the one or more registers 406 on behalf of the one or more guest operating systems 430 with a virtual address of a base address of the local memory 404.

A guest operating system 430 can issue an instruction that the module 402 executes. The address, as a virtual address, passing to nonlocal memory 416 may have different meanings depending on which guest operating system 430 issued the instruction. The IOMMU 412 can translate the address into a physical address by using information regarding which guest operating system 430 specifies the address and how the address translation is to be performed. Performing the address translation externally to the module 402, for example performing the translation on the IOMMU 412, may take an undesired amount of time, slowing execution. The illustrative computer system 400 in which the module 402 operates uses addresses that are virtual addresses. The instruction may be a descriptor, which is a set of commands that are processed, for example, by hardware such as a security module that is configured to perform cryptographic functions.

In an illustrative embodiment, all addresses internal to the module 402 are virtual addresses so that the DMA controller 418 generates virtual addresses and determines whether the generated virtual address corresponds to memory in on-module local memory 404 and should use the local bus 414; or whether the address is an external address and therefore is passed off-module, through the IOMMU 412 and the system bus 410. The virtual address is translated to a physical address and passed to the appropriate nonlocal memory 416. If the only address information available for the local memory 404 is a location in the system physical address map and the internal address generated by the DMA controller 418 is a virtual address, then whether the address belongs to the on-module local memory 404 or an external address cannot be determined since the system bus 410 uses physical addressing and the internal address is a virtual address. The appropriate memory access location is determined by performing translation. Accordingly, without an internal technique for determining proper addressing, the virtual address generated by the DMA controller would pass off-module for virtual-to-physical address translation via the IOMMU 412. The address is a physical address and can be routed around to the external port of the on-chip local memory 404 via the portion of the system bus 410. This routing consumes some time and bandwidth on the system bus 410, and the address translation in the IOMMU 412 also may consume additional time, potentially causing delay. Use of the system bus 410 causes contention with other devices for the bus, using extra bandwidth on the system bus 410 that could be used by other devices and processes. The external routing pathway via the system bus 410 has a further drawback in that internal special security signals between the DMA controller 418 and the internal local memory 404 cannot be exploited.

Several techniques can be used to determine whether a received virtual address corresponds to local memory 404. In a first embodiment, the virtual address can be applied to the IOMMU 412, which is external to the module 402, to perform the address translation. The IOMMU 412 can pass the translated address back to the module 402 and used by the module 402 to compare the returned physical address with the bounds of the local memory 404 and determine whether the address is within the local memory 404. Thus, the virtual address is applied to the IOMMU 412 to determine whether the access is within the local memory 404, not to route the access back to the local memory 404. Drawbacks of the first embodiment include complexity of the interaction, delay in the memory access, added usage of bus bandwidth, and that the IOMMU 412 generally does not support the operation.

In a second embodiment, the address translation functionality of the IOMMU 412 can be duplicated internally inside the module 402. A virtual address is received by the module 402 and the address translation functionality within the module 402 determines a corresponding physical address, then performs a comparison of the physical address to the local address bounds of the local memory 404. If the physical address is within the local memory boundaries, the local bus 414 in the module 402 is used for the memory access. If the physical address is outside the local memory boundaries, the virtual address is sent out on the system bus 410 for use in the memory access of nonlocal memory 416. A drawback of the second embodiment is the use of substantial area on the integrated circuit by duplicating circuits for performing the address translation functionality, particularly considering that most memory accesses are likely to be external and not pertinent to the local memory 404. A further drawback is that the cost in circuit area and processing time to enable translation of all virtual addresses may be unwarranted.

A third embodiment exploits a realization that full address translation is unnecessary and a more efficient method can use a simple comparison. For example, a system 400 can facilitate local memory accesses by using a backward translation. A hypervisor 426 or other control operating system can be configured to take the physical address of the local memory 404 and perform a backward translation. The backward translation specifies which virtual addresses for a guest operating system or what virtual address range for the guest operating system maps to the local memory 404. The local memory 404, which may be considered a special resource with respect to the system bus 410 and computer system 400 outside the module 402, can be constrained to be contiguous in virtual address space. The hypervisor 426 can be configured to map the entire local memory, however large, to a contiguous block of memory in the virtual address space of the guest operating system. Two addresses can be specified including a starting virtual address and an ending virtual address for the local memory 404. The starting address and the ending address, or equivalently a starting address and a length, can be adjusted and used to simplify determination of local memory addresses without full address translation within the module 402. Thus, the module 402 receives a virtual address for a particular guest operating system 430 and generated by the DMA controller 418, and the received virtual address is compared to the virtual starting address and the virtual ending address of the local memory 404 that the hypervisor 426 has previous programmed for that guest operating system 430 into the module 402. If the received virtual address is inside the local memory address range, the local bus 414 is used. If not, the address is sent out on the external system bus 410 to be translated to find a proper physical address. The hypervisor 426 determines and sets the virtual base address of the local memory 404 including, for example a virtual start address and a virtual end address, for each guest operating system that the hypervisor 426 creates and runs. The module 402 operates in cooperation with the hypervisor 426 and performs a virtual address comparison rather than a physical address comparison. The virtualized system 400 has address ranges of local memory 404 that are specified by programmable registers 406. The address ranges can be programmed with a virtual address by the hypervisor 426 for each guest operating system 430.

For use by multiple guest operating systems, a hypervisor can program the values when a particular guest operating system is in operation. Other embodiments can have multiple register sets, with top and bottom-of-range registers allocated for multiple guest operating systems, thereby enabling concurrent usage of multiple guest operating systems. In further embodiments, a virtual machine identifier (VMID) can be used as an identifier of the virtual address space of an address. The VMID can select which register to use. In further embodiments in which the module 402 is a cryptographic or security module, a security domain identifier (SDID) can be used as an identifier of the virtual address space of an address.

The disclosed embodiments enable virtualized local storage without substantial modification of the MMU. Thus, a hypervisor can be used to specify a virtual address range, which is the reverse of virtual to physical address translation. Thus, the hypervisor determines the range of local memory addresses by using the physical addresses in local memory to find a corresponding virtual address, which is set by the hypervisor for a given guest operating system. No actual translation of the virtual address, in the manner of MMU operation, is required. In essence, the comparison is made in virtual space rather than physical space.

Figure 5:
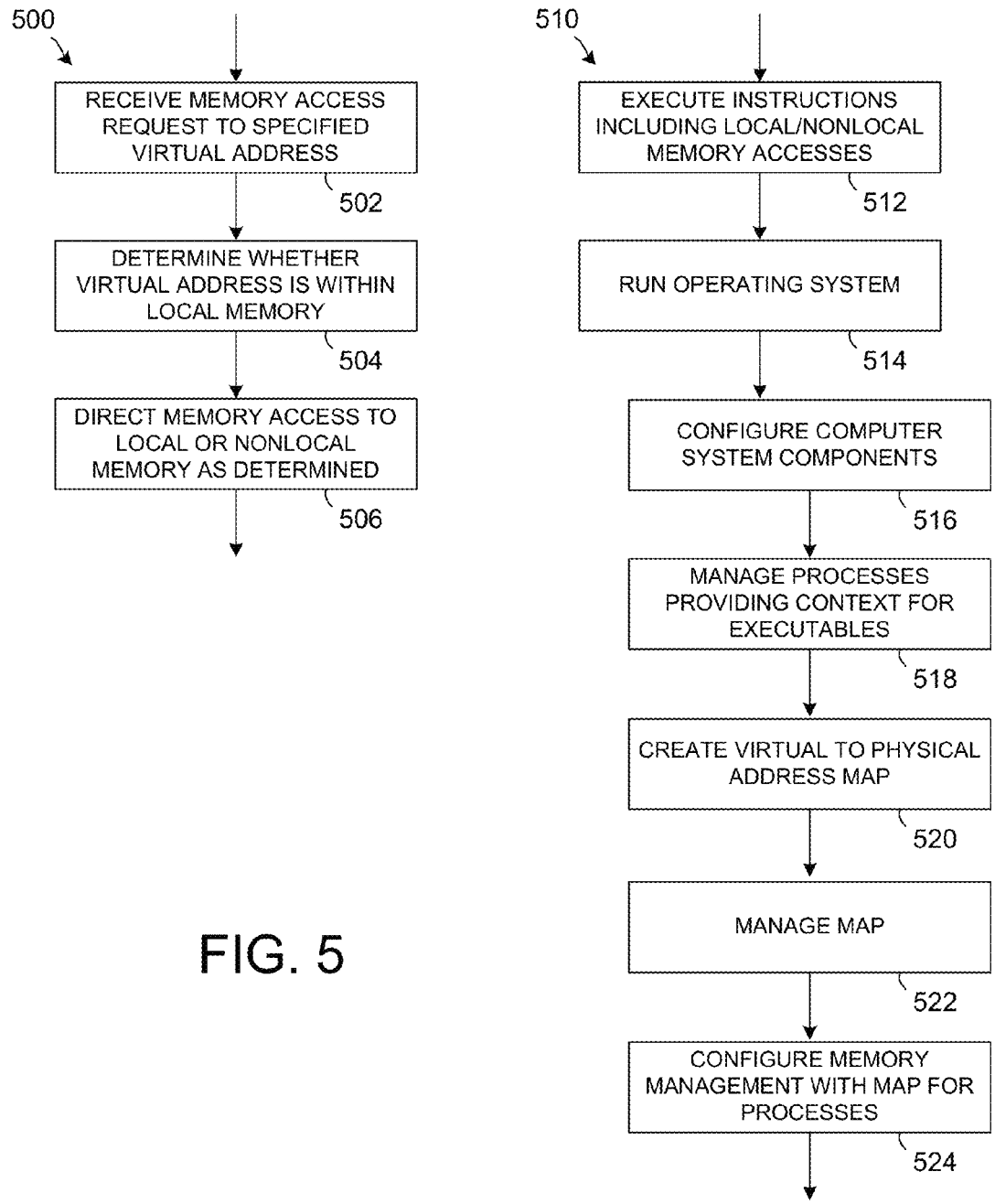
FIG. 5, including FIG. 5.1, is a schematic block diagram depicting an embodiment of method of operating a computer system that can be used to improve protection of secure memory by determining whether access is for local memory without passing through system memory management and/or an external bus.

Referring to FIG. 5, including FIG. 5.1, a schematic block diagram depicts an embodiment of method of operating a computer system that can be used to improve protection of secured memory by determining whether access is for local memory without passing through system memory management and/or an external bus. An embodiment of a method 500 of operating a computer system can include receiving 502 a memory access request specified to a virtual address, and determining 504 whether the virtual address is within local memory. The memory access can be directed 506 either to the local memory via the local bus or to a nonlocal memory via the system bus based on the determination.

In further embodiments, the method 510 of operating a computer system can further include executing 512 instructions including instructions for accessing the local memory and the nonlocal memory, running 514 an operating system including configuring 516 components of the computer system, and managing 518 a plurality of processes that provide context for executables executing on the computer system. The method 510 can further comprise creating 520 a map for converting virtual addresses to physical addresses for the plurality of processes, managing 522 the map, and configuring 524 memory management with the map for the plurality of processes. Typically, a different map is created 520 for each process. Managing 522 the map can include actions of configuring memory management with a map of virtual to physical addresses for a particular process, enabling the process to program the module directly without operating system intervention, fragmenting a virtual to physical address map such that a contiguous virtual address block is made up of many smaller contiguous physical address blocks, handling the fragmentation such as by using a "scatter-gather" operation, and the like.

In some embodiments and/or applications, the method 530 of operating a computer system can further include running 532 an operating system including assigning 534 a plurality of portals selectively to a plurality of processes, allocating 536 a plurality of local memory virtual address registers selectively to the plurality of portals, and allocating 538 a plurality of local memory partitions selectively to the plurality of portals. The method 530 of operating the computer system can further include configuring 540 local memory virtual addresses for the plurality of processes.

Figure 6:
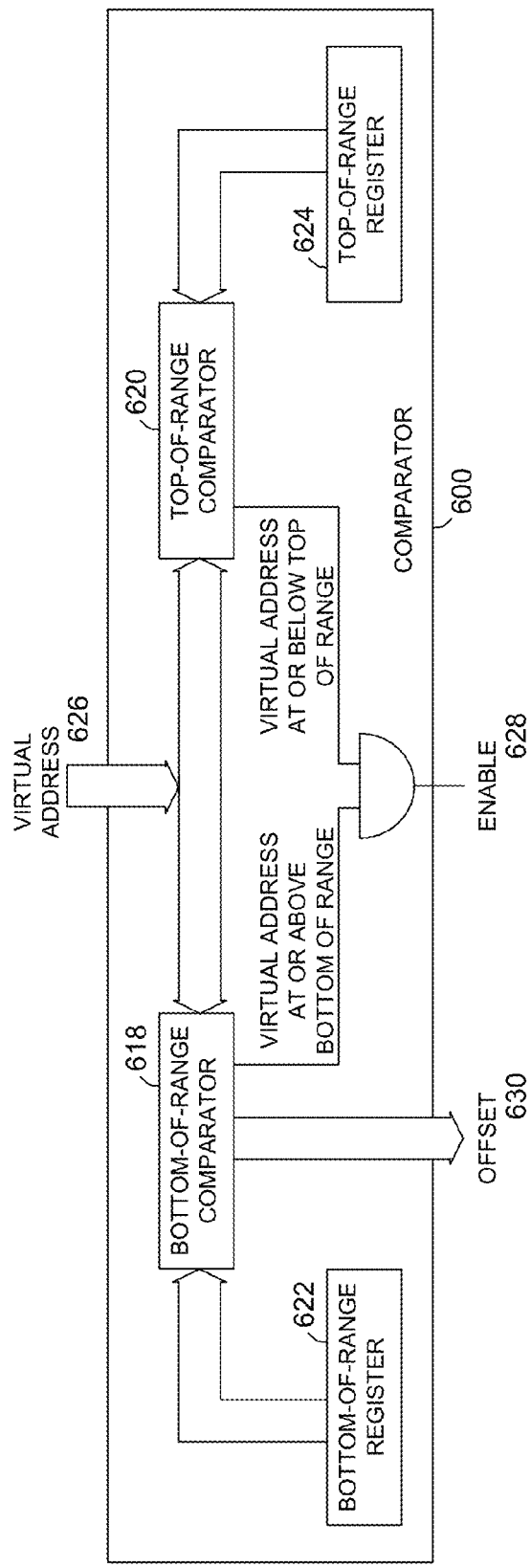
FIG. 6 is a schematic block diagram illustrating an embodiment of a comparator device that can be used to perform comparisons in a module.

Referring to FIG. 6, a schematic block diagram illustrates an embodiment of a comparator device 600 that can be used to perform comparisons in a module. For example, the comparator device 600 can be used as the address comparator 120, 320 shown in FIGS. 1 and 3. The comparator device 600 includes a bottom-of-range comparator 618 and a top-ofrange comparator 620 that make comparisons against, respectively, a bottom-of-range register 622 and a top-of-range register 624. If the received virtual address 626 is at or above the bottom of the range and at or below the top of the range, and enable signal 628 is actuated. The bottom-of-range register 622 and the top-of-range register 624 set the range of virtual addresses for a particular virtual address to physical address map. If the received virtual address is between the bounds set by the registers 622 and 624, the local bus to local memory is enabled. When the enable signal 628 is activated, a memory access is sent via a local bus to local memory. Otherwise, the memory access is sent out on the system bus to the IOMMU, which performs a translation of the virtual address to a physical address. An offset 630 value can be used as an address to access the local memory. The enable signal 628 switches between placing the offset 630 on the local bus and placing the virtual address on the system bus.

In another embodiment, rather than using the bottom-of-range comparator 618 and the top-of-range comparator 620, a comparator device 600 can use a top (or bottom) of range comparator and a comparison offset into the memory. In either case, the comparator 600 controls an enable signal 628 that determines whether to use the local bus or the system bus.

Figure 7:
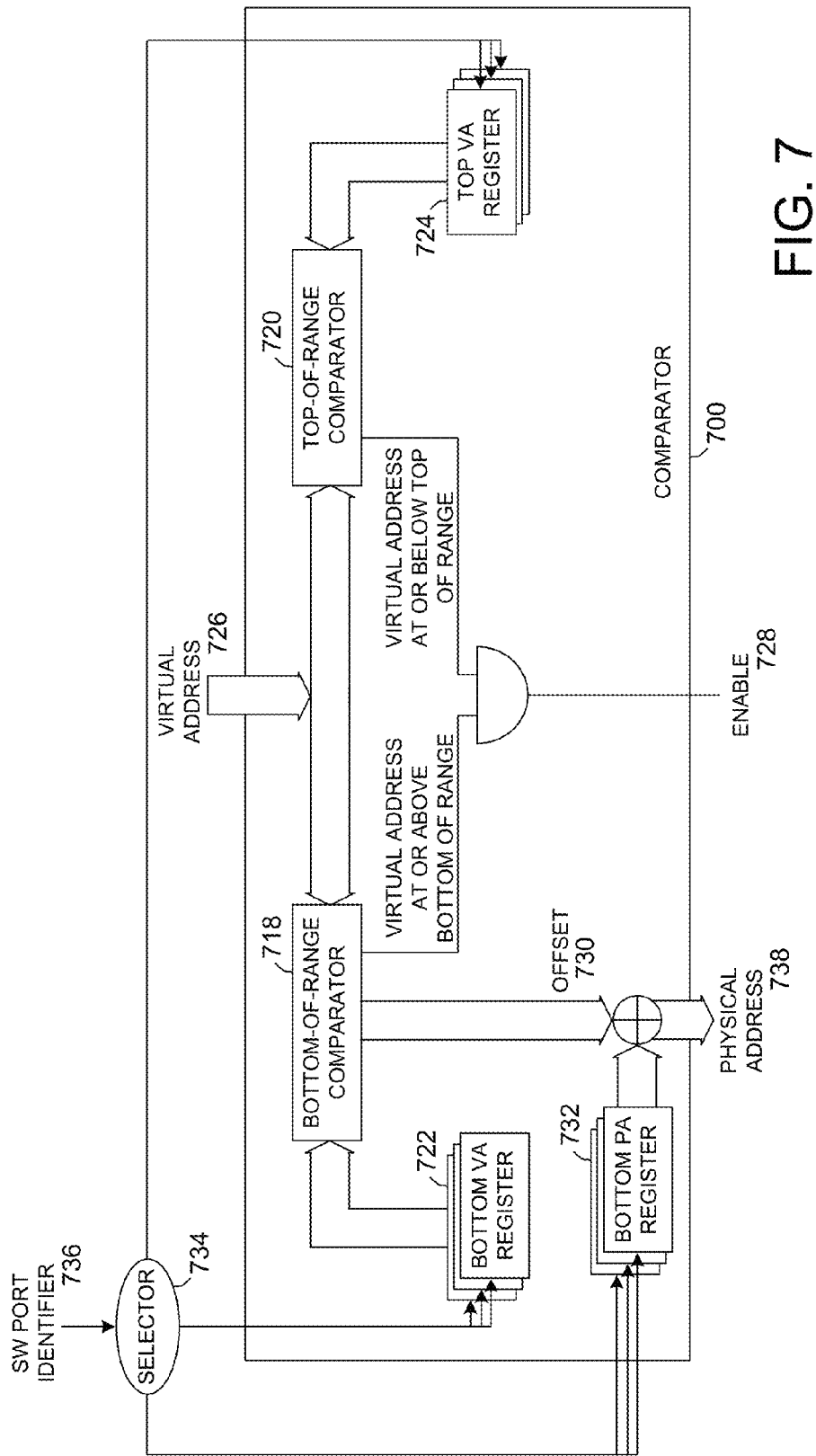
FIG. 7 is a schematic block diagram showing an embodiment of a comparator device that can be used to perform comparisons in a module for concurrent use with multiple software portals.

Referring to FIG. 7, a schematic block diagram illustrates an embodiment of a comparator device 700 that can be used to perform comparisons in a module for concurrent use with multiple software portals. For example, the comparator device 700 can be used as the address comparator 220, 420 shown in FIGS. 2 and 4 with multiple local memory partitions, each having a distinct physical base address. The illustrative comparator 700 has multiple top virtual address (VA) registers 724 and multiple bottom virtual address (VA) registers 722, which are respectively coupled to a top-of-range comparator 720 and a bottom-of-range comparator 718. The comparator 700 can further include multiple bottom physical address (PA) registers 732 corresponding to distinct local memory partitions. A selector 734, which is shown external to the comparator 700 but in some embodiments can be located within the comparator 700, takes a software (SW) portal identifier 736 presented with the virtual address 726 during a memory access, and selects a consistent set of bottom virtual address registers 722, top virtual address registers 724, and bottom physical address registers 732. The offset 730 from the bottom-of-range comparator 718 is added or adjoined to the selected bottom physical address value to give a physical address 738 within local memory. The comparator 700 receives a virtual address 726 and responds with the physical address 738 and an enable signal 728.

Other suitable comparator embodiments may have other characteristics. For example, a comparator embodiment may exclude bottom physical address registers. In some embodiments, a software portal identifier can be passed along the local bus. Some configurations may include local memory filters accessed from the local bus based on the offset and software portal identifier. In still other arrangements, local memory partitioning can be achieved by a configuring filter.

Executable logic such as software, firmware, and the like, can perform various operations, including operations by an operating system, by executables, by logic in the module, and by the address comparator. An example system embodiment can have a virtual memory operating system and a module with a single portal. Operating system operations can include creating a new process, assigning a software portal to the process, configuring memory management such as a processor MMU and an IOMMU with a virtual to physical address map for the process, configuring the module with the local memory virtual address, and launching an executable program in the process. Executable operations can include accessing the module via a corresponding software portal, and instructing the module to access memory using the virtual address. Module operations can include receiving a configuration or configuration information from the operating system, receiving instructions from an executable process, and accessing memory using the process virtual address. Address comparator operations can include receiving a memory access to a specified virtual address, determining whether the virtual address lies within the local memory, and, if within local memory, calculating the local memory address from the virtual address, and directing the memory access to the local bus using the local memory address. If the virtual address is outside the local memory, the address comparator can direct the memory access to the system bus using the virtual address. The address comparator operations maintain the advantages of the local bus by enabling a fast and efficient operating method in which the determination of whether the virtual address lies within the local memory can be made by comparison with a predetermine range of virtual addresses for local memory. The calculation of the local memory address from the virtual address can be made, for example, by addition, subtraction, or truncation using predetermined values.

Another example embodiment can use a method of choosing between the local bus and the system bus for memory accesses made within multiple virtual address spaces concurrently with the operation of the address comparator configured for multiple software portals. Operating system operations can be performed by a hypervisor. Executable operations can be performed by guest operating systems. Additional information is used to identify a software portal and corresponding virtual address space. The local memory may be partitioned. The determination whether the virtual address lines within the appropriate memory partition depends on both the virtual address and the software portal identifier. The calculation of a local memory address can involve the software portal identifier. When using the system bus, the software portal identifier can be sent to the IOMMU to assist selection of the correct virtual to physical address mapping. The software portal identifiers used on the local bus may not have the same value to exploit usage of the fast local bus. In an example operating method for the address comparator, the address comparator can receive a memory access for an identified software portal to a virtual address and determine whether the virtual address lies within the local memory partition for the corresponding software portal. If the virtual address is within the local memory partition, the address comparator calculates the local memory address from the virtual address and the software portal identifier, and directs the memory access to the local bus using the local memory address. If outside the local memory, the address comparator directs the memory access to the system bus using the virtual address and the software portal identifier.

The system, electronic circuit, and operating method can be configured with many variations. For example, the virtual memory system can be a virtual memory operating system, a virtual platform, or a combination of a virtual memory operating system and platform. Examples of virtual memory operating systems can include Windows, Linux, or many others with a per-process virtual to physical address map. Example virtual platforms can include VMware, Xen, or the like with per-virtual machine virtual to physical address maps. Combined virtual memory operating systems and platforms can have two-stage translation including translation of a process virtual address to a virtual machine virtual address, and translation of the virtual machine virtual address to a physical address. In some embodiments, the IOMMU can perform either or both translation stages.

The processor can have any suitable configuration, for example single-core, multiple core, heterogeneous multiple processors, and the like, such as Advance RISC Machine (ARM) processors, PowerPC-based processors, and other processors. Examples of suitable IOMMUs can include an ARM SMMU, PAMU, and others. The software portal can be module registers, or shared memory buffer, or some combination of both, or the like. The address comparator can be contained within a DMA controller or separate. Local memory virtual address registers can be within the address comparator or separate. The local memory can be any size from a few bytes to multiple megabytes or larger.

In some embodiments, the local bus can have a different data width or timing in comparison to the system bus, allowing lower latency and higher throughput. Memory access types can be specific to the particular module and local memory, for example in terms of special data types, access permissions, memory attributes, transaction owner identification, and the like.

Local memory can be partitioned between software portals in various ways, for example using address comparator logic or additional access controls on the local bus. In some embodiments, the address comparator logic can include an additional base physical address register for each software portal. In some configurations, the local memory partitions may overlap.

In various applications and/or embodiments, the module can be a cryptographic co-processor, an audio-visual link controller, a video/graphics accelerator, or other application engine. An example cryptographic co-processor can include local bus access types to distinguish key and message data. A illustrative audio-visual link controller can have a local memory which contains link protection data and is inaccessible from the system bus after loading. A video/graphics accelerator can include a local bus which enables a high-performance working area.

Various systems can have any suitable arrangement of hardware and software. For example the hardware and software combinations shown in FIGS. 3 and 4 can be exchanged such that a single software portal is used with a hypervisor and multiple software portals can be used with an operating system.

The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

While the principles of the disclosed system are described above in connection with specific apparatus, it is to be clearly understood that this description is made only by way of example and not as a limitation on scope of the appended claims. The illustrative pictorial diagrams depict structures and process actions in systems with virtualized local storage. Although the particular examples illustrate specific structures and process acts, many alternative implementations are possible and commonly made by simple design choice. Actions may be executed in different order from the specific description herein, based on considerations of function, purpose, conformance to standard, legacy structure, and the like.

An embodiment of an electronic circuit includes a module that accesses memory using virtual addressing, the memory including local memory that is local to the module and nonlocal memory that is accessible via a system bus coupled to the module, the module including logic coupled to the local memory via a local bus, the logic configured to receive a memory access specified to a virtual address, determine whether the virtual address is within the local memory, and direct the memory access either to the local memory via the local bus or to the nonlocal memory via the system bus based on the determination. According to a further embodiment, the electronic circuit can be configured such that the logic determines whether the virtual address of the memory access is within address boundaries of the local memory and, if so, calculates a local memory address from the virtual address and directs the memory access to the local bus using the local memory address, bypassing an external system bus. According to a further embodiment, the electronic circuit is configured such that the module further includes a software portal, a plurality of registers configured with local memory virtual address information using the software portal, and an address comparator coupled to the plurality of registers that uses the plurality of registers to determine whether the memory access is directed to the local bus or the system bus. According to a further embodiment, the electronic circuit is configured such that the module further includes a direct memory access (DMA) controller that uses virtual addressing, and an address comparator coupled to the DMA controller that determines whether the memory access is directed to the local bus or the system bus and bypasses the system bus when the DMA controller accesses the local memory. According to a further embodiment, the electronic circuit is configured such that the module further includes a plurality of software portals, a plurality of registers configured with local memory virtual address information using the plurality of software portals, the plurality of registers including distinct local memory virtual address registers respectively allocated for the plurality of software portals designating respective distinct local memory partitions, a direct memory access (DMA) controller that uses virtual addressing and indicates an indicated software portal of the plurality of software portals for which the memory access is made, and an address comparator that selects local memory virtual address registers for the indicated software portal and directs local memory accesses via the local bus to a distinct local memory partition corresponding to the indicated software portal. According to a further embodiment, the electronic circuit is configured such that the module further includes logic that generates a modified virtual address from a received virtual address by performing addition, subtraction, or truncation and accesses the local memory using the modified virtual address.

An embodiment of a computer system includes an electronic circuit including a system bus, a nonlocal memory coupled to the system bus, a module coupled to the system bus including logic and a local memory, the module configured to access the local memory and the nonlocal memory using virtual addressing, the logic configured to receive a memory access specified to a virtual address, determine whether the virtual address is within the local memory, and direct the memory access either directly to the local memory or to the nonlocal memory via the system bus based on the determination, and a processor coupled to the system bus that executes instructions including instructions for accessing the local memory and the nonlocal memory. According to a further embodiment, the computer system further includes executable logic including at least one operating system that configures the electronic circuit and manages a plurality of processes, and the plurality of processes that provide context for executables executing on the processor. According to a further embodiment, the computer system further includes executable logic including at least one operating system that creates and manages a map for converting virtual addresses to physical addresses for a plurality of processes, and configures memory management with the map for ones of the plurality of processes. According to a further embodiment, the computer system further includes the module further including a plurality of portals, a plurality of local memory virtual address registers, and a plurality of local memory partitions, and executable logic including at least one operating system that assigns the plurality of portals selectively to a plurality of processes including allocating the plurality of local memory virtual address registers selectively to the plurality of portals, allocating the plurality of local memory partitions selectively to the plurality of portals, and configuring local memory virtual addresses for the plurality of processes. According to a further embodiment, the computer system further includes executable logic including executables that operate the module using instructions dispatched to the module using virtual addresses configured for a plurality of processes. According to a further embodiment, the computer system further includes executable logic including executables configured to operate the module such that the module further includes a direct memory access (DMA) controller that uses virtual addressing and the module selectively accesses the local memory and the nonlocal memory using the DMA controller on behalf of the executables. According to a further embodiment, the computer system further includes the module further including a portal, and executable logic including at least one operating system and a plurality of processes such that the plurality of processes time-share the portal and the at least one operating system resets a local memory virtual address configuration during re-assignment of the portal. According to a further embodiment, the computer system further includes executable logic including a plurality of virtual machines that provide context for a respective guest operating system of a plurality of guest operating systems, and a hypervisor that configures the electronic circuit and manages the plurality of virtual machines, the hypervisor configured to create and manage a map for converting virtual addresses to physical addresses for the plurality of guest operating systems, and configures memory management with the map for ones of the plurality of virtual machines. According to a further embodiment, the computer system further includes the module further including a plurality of portals, a plurality of local memory virtual address registers, and a plurality of local memory partitions, and executable logic including a hypervisor that partitions the local memory and the plurality of portals among a plurality of virtual machines, and configures a local memory virtual address for the plurality of virtual machines in the local memory virtual address registers for an assigned portal of the plurality of portals, the hypervisor configured to assign a virtual machine virtual address to ones of the plurality of virtual machines, the virtual machine virtual address including a selected portal and a selected local memory partition. According to a further embodiment, the computer system further includes executable logic including a guest operating system running on a virtual machine that operates the module using guest operating system instructions dispatched to the module using a virtual address configured for the virtual machine. According to a further embodiment, the computer system further includes the module further including a direct memory access (DMA) controller and a portal, and executable logic including a guest operating system running on a virtual machine that accesses the local memory and the nonlocal memory using the DMA controller on behalf of the guest operating system as specified by a virtual address configured for the virtual machine and a portal indicated for making the access.

An embodiment of a method of operating a computer system includes receiving a memory access request specified to a virtual address, determining whether the virtual address is within local memory, and directing the memory access either to the local memory via the local bus or to a nonlocal memory via the system bus based on the determination. According to a further embodiment, the method of operating a computer system further includes executing instructions including instructions for accessing the local memory and the nonlocal memory, and running an operating system including configuring components of the computer system, managing a plurality of processes that provide context for executables executing on the computer system, creating a map for converting virtual addresses to physical addresses for the plurality of processes, managing the map, and configuring memory management with the map for the plurality of processes. According to a further embodiment, the method of operating a computer system further includes running an operating system including assigning a plurality of portals selectively to a plurality of processes, allocating a plurality of local memory virtual address registers selectively to the plurality of portals, allocating a plurality of local memory partitions selectively to the plurality of portals, and configuring local memory virtual addresses for the plurality of processes.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, components, configurations, and topologies are given by way of example only. The parameters, components, configurations, and topologies can be varied to achieve the desired structure as well as modifications, which are within the scope of the claims. Variations and modifications of the embodiments disclosed herein may also be made while remaining within the scope of the following claims.

What is claimed is:
1. A computer system comprising:
an electronic circuit comprising:
 a system bus;
 a nonlocal memory coupled to the system bus;
 a processor coupled to the system bus;
 a module coupled to the system bus, the module comprising: a local memory, an address comparator, a plurality of base virtual address registers, a plurality of top virtual address registers, and a direct memory access (DMA) controller, wherein
 the address comparator is coupled to the local memory via a local bus,
 the address comparator is coupled to each of the plurality of base virtual address registers and the plurality of top virtual address registers,
 the DMA controller is configured to access the local memory and the nonlocal memory using virtual addressing, independently of the processor; and
 a memory management unit (MMU) coupled between the address comparator of the module and the system bus;
 wherein
 the address comparator is configured to:
 receive a first memory access specified to a first received virtual address from the DMA controller, wherein the first memory access is associated with a first software component of a plurality of software components implemented in the computer system, select a first base virtual address register and a first top virtual address register that are associated with the first software component, wherein the first base virtual address register and the first top virtual address register respectively store a base virtual address and a top virtual address that define a first range of virtual addresses from a plurality of ranges of virtual addresses, wherein each of the plurality of ranges of virtual addresses is assigned to the local memory, compare the first received virtual address to the base virtual address and to the top virtual address, in response to a combination of a first determination that the first received virtual address is at or above the base virtual address and a second determination that the first received virtual address is at or below the top virtual address:
calculate an offset corresponding to the first received virtual address, and
direct the first memory access directly to the local memory via the local bus, using the offset as a physical address in the local memory; and in response to a third determination that the first received virtual address is below the base virtual address or a fourth determination that the first received virtual address is above the top virtual address:
direct the first memory access to the system bus via the MMU, wherein
the MMU is configured to translate the first received virtual address of the first memory access into a physical address of the nonlocal memory according to a map for converting virtual addresses to physical addresses; and the processor is configured to execute instructions including instructions for accessing the local memory and the nonlocal memory.

2. The computer system according to claim 1 further comprising:
executable logic comprising:
at least one operating system that configures the electronic circuit and manages a plurality of processes; and
the plurality of processes that provide context for executables executing on the processor.

3. The computer system according to claim 1 further comprising:
executable logic comprising at least one operating system that creates and manages the map for converting virtual addresses to physical addresses for a plurality of processes, and configures memory management with the map for ones of the plurality of processes, wherein the first received virtual address is translated to the physical address of the nonlocal memory using the map.

4. The computer system according to claim 1 further comprising:
the module further comprising a plurality of portals, a plurality of local memory virtual address registers, and a plurality of local memory partitions; and
executable logic comprising at least one operating system that assigns the plurality of portals selectively to a plurality of processes comprising allocation of the plurality of local memory virtual address registers selectively to the plurality of portals, allocation of the plurality of local memory partitions selectively to the plurality of portals, and configuration of local memory virtual addresses for the plurality of processes.

5. The computer system according to claim 1 further comprising:
executable logic comprising executables that operate the module using instructions dispatched to the module using virtual addresses configured for a plurality of processes.

6. The computer system according to claim 1 further comprising:
executable logic comprising executables configured to operate the module wherein the module further comprises a direct memory access (DMA) controller that uses virtual addressing and the module selectively accesses the local memory and the nonlocal memory using the DMA controller on behalf of the executables.

7. The computer system according to claim 1 further comprising:
the module further comprising a portal; and
executable logic comprising at least one operating system and a plurality of processes wherein the plurality of processes time-share the portal and the at least one operating system resets a local memory virtual address configuration during re-assignment of the portal.

8. The computer system according to claim 1 further comprising:
executable logic comprising:
a plurality of virtual machines that provide context for a respective guest operating system of a plurality of guest operating systems; and
a hypervisor that configures the electronic circuit and manages the plurality of virtual machines, the hypervisor configured to create and manage a map for converting virtual addresses to physical addresses for the plurality of guest operating systems, and configures memory management with the map for ones of the plurality of virtual machines.

9. The computer system according to claim 1 further comprising:
the module further comprising a plurality of portals, a plurality of local memory virtual address registers, and a plurality of local memory partitions; and
executable logic comprising a hypervisor that partitions the local memory and the plurality of portals among a plurality of virtual machines, and configures a local memory virtual address for the plurality of virtual machines in the local memory virtual address registers for an assigned portal of the plurality of portals, the hypervisor configured to assign a virtual machine virtual address to ones of the plurality of virtual machines, the virtual machine virtual address comprising a selected portal and a selected local memory partition.

10. The computer system according to claim 1 further comprising:
executable logic comprising a guest operating system running on a virtual machine that operates the module using guest operating system instructions dispatched to the module using a virtual address configured for the virtual machine.

11. The computer system according to claim 1 further comprising:
the module further comprising a direct memory access (DMA) controller and a portal; and
executable logic comprising a guest operating system running on a virtual machine that accesses the local memory and the nonlocal memory using the DMA controller on behalf of the guest operating system as specified by a virtual address configured for the virtual machine and a portal indicated for making the access.

12. A method of operating a computer system comprising:
receiving a memory access request specified to a received virtual address from a direct memory access (DMA) controller, wherein the memory access request is associated with a first software component of a plurality of software components implemented in the computer system;
selecting a first base virtual address register and a first top virtual address register that are associated with the first software component, wherein the first base virtual address register and the first top virtual address register respectively store a base virtual address and a top virtual address that define a first range of virtual addresses from a plurality of ranges of virtual addresses, wherein each of the plurality of ranges of virtual addresses is assigned to a local memory, and the first range of virtual addresses is associated with the first software component;
comparing the received virtual address to the base virtual address and to the top virtual address;
in response to a combination of a first determination that the first received virtual address is at or above the base virtual address and a second determination that the first received virtual address is at or below the top virtual address:
calculating an offset corresponding to the first received virtual address, and
directing the memory access to the local memory via a local bus, using the offset as a physical address in the local memory;
in response to a third determination that the first received virtual address is below the base virtual address or a fourth determination that the first received virtual address is above the top virtual address:
directing the memory access to a system bus via a memory management unit (MMU), wherein the system bus is coupled to a nonlocal memory, and the MMU is configured to translate the received virtual address into a physical address of the nonlocal memory according to a map for converting virtual addresses to physical addresses.

13. The method of operating a computer system according to claim 12 further comprising:
executing instructions including instructions for accessing the local memory and the nonlocal memory; and
running an operating system comprising:
configuring components of the computer system;
managing a plurality of processes that provide context for executables executing on the computer system;
creating the map for converting virtual addresses to physical addresses for the plurality of processes;
managing the map;
configuring memory management with the map for the plurality of processes; and
translating the received virtual address to the physical address of the nonlocal memory using the map.

14. The method of operating a computer system according to claim 12 further comprising:
running an operating system comprising:
assigning a plurality of portals selectively to a plurality of processes;
allocating a plurality of local memory virtual address registers selectively to the plurality of portals;
allocating a plurality of local memory partitions selectively to the plurality of portals; and
configuring local memory virtual addresses for the plurality of processes.

15. The computer system according to claim 1 wherein:
the plurality of software components comprise at least one of a group including a virtual machine, an executable, an operating system, a hypervisor, and a process.

16. The computer system according to claim 1 wherein the module further comprises:
a first software portal associated with the first software component.

17. The computer system according to claim 1 wherein:
the module further comprises logic that generates a modified virtual address from the first received virtual address by performing addition, subtraction, or truncation and accesses the local memory using the modified virtual address.

18. The computer system according to claim 1 wherein:
the logic is further configured to:
receive a second memory access specified to a second received virtual address, wherein the second memory access is associated with a second software component of the plurality of software components,
select a second base virtual address register and a second top virtual address register that are associated with the second software component, wherein the second base and top virtual address registers respectively store a second base virtual address and a second top virtual address that define a second range of virtual addresses from the plurality of ranges of virtual addresses,
compare the second received virtual address to the second base virtual address and to the second top virtual address,
in response to a combination of a first determination that the second received virtual address is at or above the second base virtual address and a second determination that the second received virtual address is at or below the second top virtual address:
calculate a second offset corresponding to the second received virtual address, and
direct the second memory access directly to the local memory via the local bus, using the second offset as a physical address in the local memory; and
in response to a third determination that the second received virtual address is below the second base virtual address or a fourth determination that the second received virtual address is above the second top virtual address:
direct the second memory access to the system bus via the MMU, wherein
the MMU is further configured to translate the second received virtual address of the second memory access into a physical address of the nonlocal memory according to the map.

* * * * *